United States Patent [19]
Ritchie et al.

[11] Patent Number: 5,902,613
[45] Date of Patent: May 11, 1999

[54] AUTOMATED THERMOSET MOLDING APPARATUS

[75] Inventors: Jack J. Ritchie, Washington; Richard Benjamin Freeman; Terry L. Ingham, both of Oxford; John J. Morse, Leonard; Joseph A. Bodary, Utica, all of Mich.

[73] Assignee: The Budd Company, Troy, Mich.

[21] Appl. No.: 08/999,300

[22] Filed: Dec. 29, 1997

Related U.S. Application Data

[62] Division of application No. 08/521,607, Aug. 30, 1995, Pat. No. 5,753,164.

[51] Int. Cl.$^6$ .................................................. B29C 43/34
[52] U.S. Cl. ......................... 425/544; 425/257; 425/297; 425/324.1; 425/546; 425/DIG. 58
[58] Field of Search ................................... 425/544, 546, 425/324.1, 297, 257, DIG. 58, 223

[56] References Cited

U.S. PATENT DOCUMENTS

| | | | |
|---|---|---|---|
| 2,710,938 | 6/1955 | Willcox et al. ........................... | 425/544 |
| 2,713,697 | 7/1955 | Willcox ..................................... | 425/544 |
| 3,969,461 | 7/1976 | Boesch et al. ...................... | 264/328.12 |
| 4,141,929 | 2/1979 | Stoops et al. ............................ | 264/160 |
| 4,339,490 | 7/1982 | Yoshioka et al. ......................... | 428/213 |
| 4,374,795 | 2/1983 | Keilp et al. ......................... | 264/328.17 |
| 4,436,685 | 3/1984 | Emura et al. ......................... | 425/324.1 |
| 4,451,528 | 5/1984 | Krause .................................... | 428/287 |
| 4,488,862 | 12/1984 | Epel et al. ........................ | 425/DIG. 60 |

(List continued on next page.)

FOREIGN PATENT DOCUMENTS

| | | |
|---|---|---|
| 0 177 736 | 4/1986 | European Pat. Off. . |
| 0 376 472 | 7/1990 | European Pat. Off. . |
| 0 510 414 A1 | 10/1992 | European Pat. Off. . |
| 0 548 801 A1 | 6/1993 | European Pat. Off. . |
| 955413 | 1/1950 | France . |
| 2 413 201 | 7/1979 | France . |
| 2 480 667 | 10/1981 | France . |
| 0 396 456 | 11/1990 | France . |
| 3336-080-A | 4/1985 | Germany ............................... 425/544 |
| 63-176115 | 7/1988 | Japan .................................... 425/546 |
| 63-207625 | 8/1988 | Japan .................................... 425/546 |

OTHER PUBLICATIONS

*Encyclopedia of Polymer Science and Engineering*, vol. 14, John Wiley & Sons, 1998, pp. 332–333 and 387.
*FRP An Introduction to Fiberglas–Reinforced Plastics/ Composites*, Owens/Corning Fiberglas, pp. 22–23, (No date).
*McGraw–Hill Encyclopedia of Science & Technology*, 6th Edition, pp. 35–40, 1987.

Primary Examiner—Robert Davis
Attorney, Agent, or Firm—Harness, Dickey & Pierce, P.L.C.

[57] ABSTRACT

An automated transfer/injection molding apparatus and process is defined that includes a charge forming unit, a shuttle unit, and a molding unit. The charge is formed from one or more slabs of reinforcing fibers and a resinous material. Once formed, the charge is preheated in the charge shuttle unit and is delivered to the molding unit, whereupon the preheated charges are forced by the pressure of a movable platform under vacuum into a mold cavity for polymerization. The fibers within the slabs are randomly oriented in parallel horizontal planes such that they are always parallel to the direction of initial flow into the cavity.

10 Claims, 12 Drawing Sheets

U.S. PATENT DOCUMENTS

| | | | |
|---|---|---|---|
| 4,569,814 | 2/1986 | Chong et al. | 264/328.5 |
| 4,611,983 | 9/1986 | Bielfedlt | 425/544 |
| 4,612,149 | 9/1986 | Iseler et al. | 264/101 |
| 4,643,126 | 2/1987 | Wilkinson et al. | 118/405 |
| 4,780,432 | 10/1988 | Minford et al. | 501/32 |
| 4,849,147 | 7/1989 | Freeman | 264/258 |
| 4,867,924 | 9/1989 | Schilkey et al. | 264/101 |
| 4,911,876 | 3/1990 | Freeman | 264/258 |
| 5,039,465 | 8/1991 | Freeman et al. | 425/84 |
| 5,057,257 | 10/1991 | Neitzke | 264/258 |
| 5,061,423 | 10/1991 | Layden | 264/108 |
| 5,130,071 | 7/1992 | Iseler et al. | 264/102 |
| 5,204,127 | 4/1993 | Prusha | 425/544 |
| 5,217,656 | 6/1993 | Buckley et al. | 264/103 |
| 5,273,418 | 12/1993 | Kato et al. | 425/297 |
| 5,275,877 | 1/1994 | Isayev | 264/108 |
| 5,286,326 | 2/1994 | Greve | 156/272.4 |
| 5,370,521 | 12/1994 | McDougall | 425/405.1 |
| 5,382,148 | 1/1995 | Buckley | 425/297 |
| 5,401,154 | 3/1995 | Sargent | 425/297 |
| 5,435,953 | 7/1995 | Osada et al. | 264/102 |
| 5,507,633 | 4/1996 | Osada et al. | 425/546 |
| 5,520,874 | 5/1996 | Chou et al. | 425/544 |

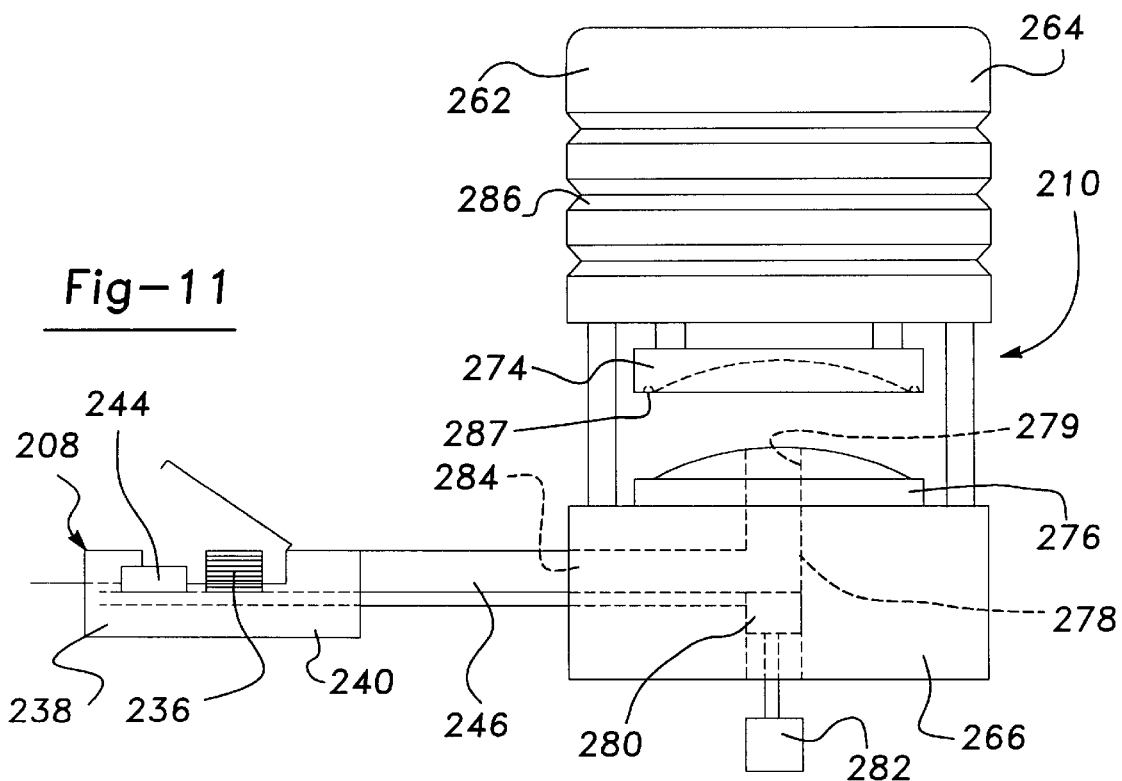
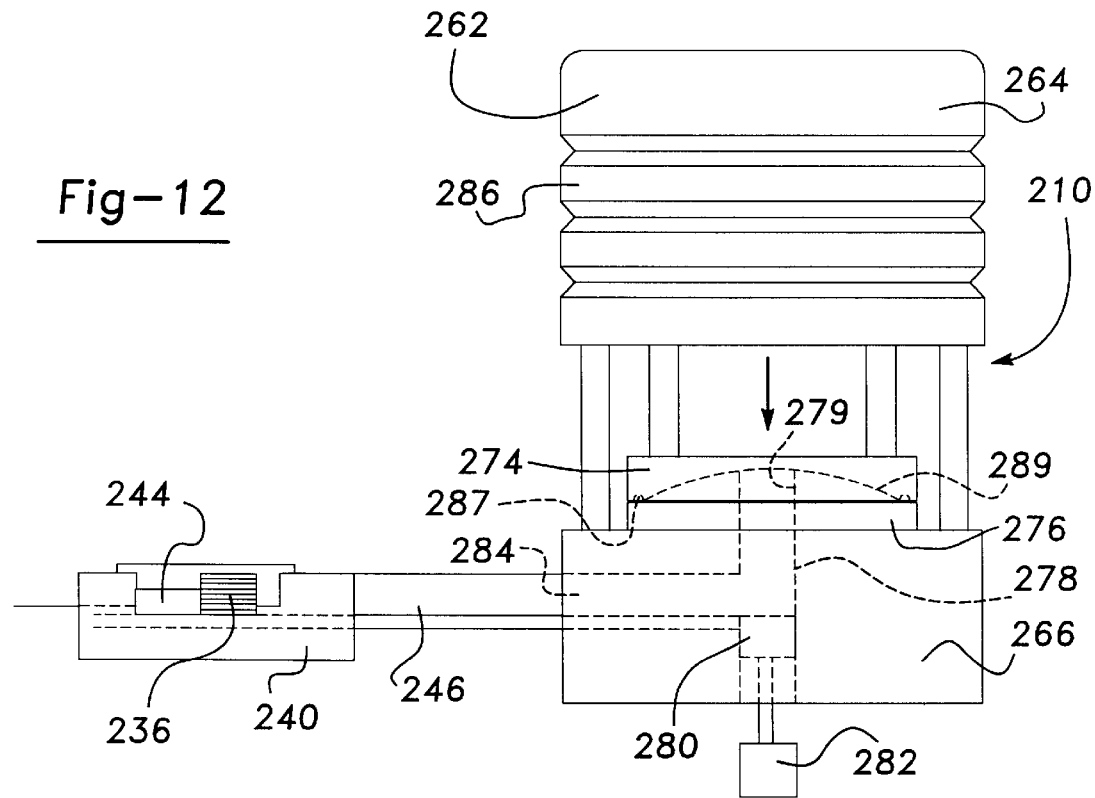

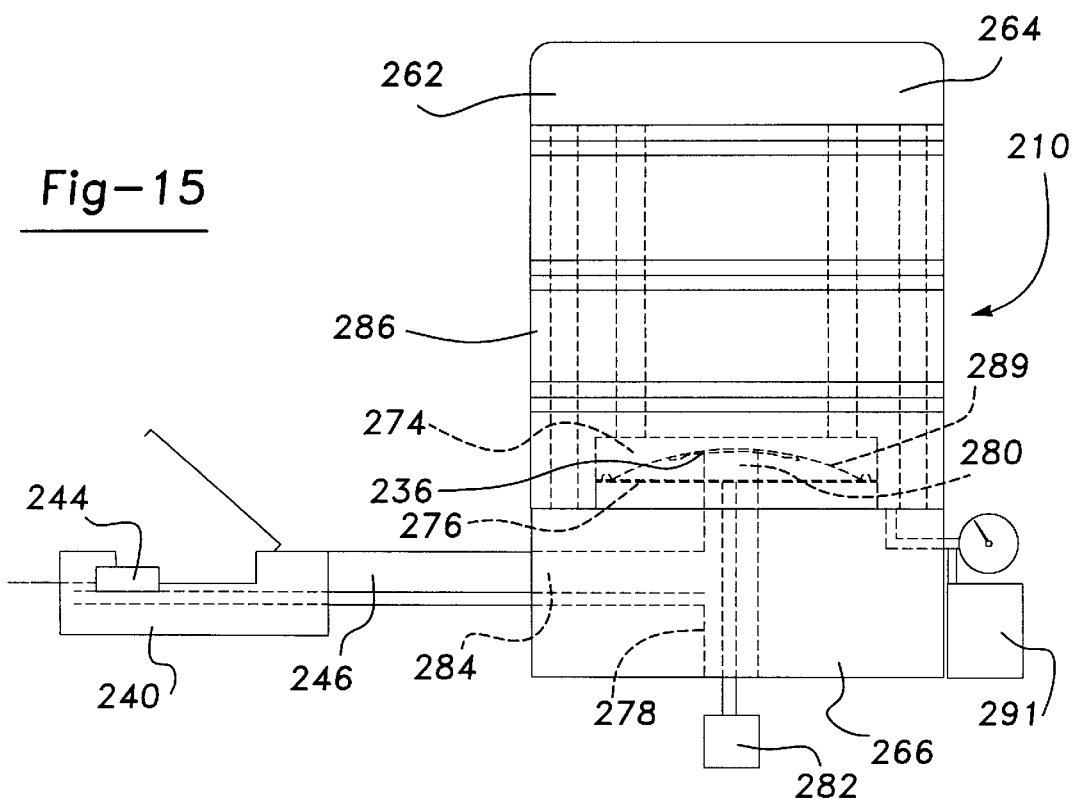
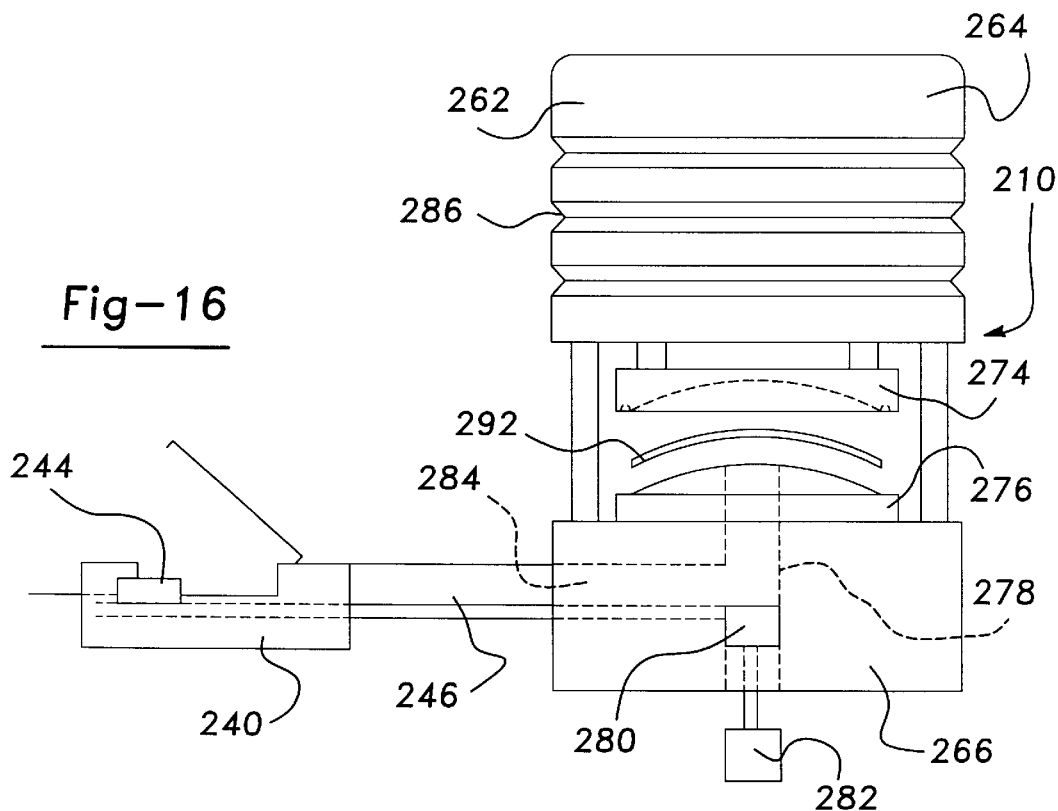

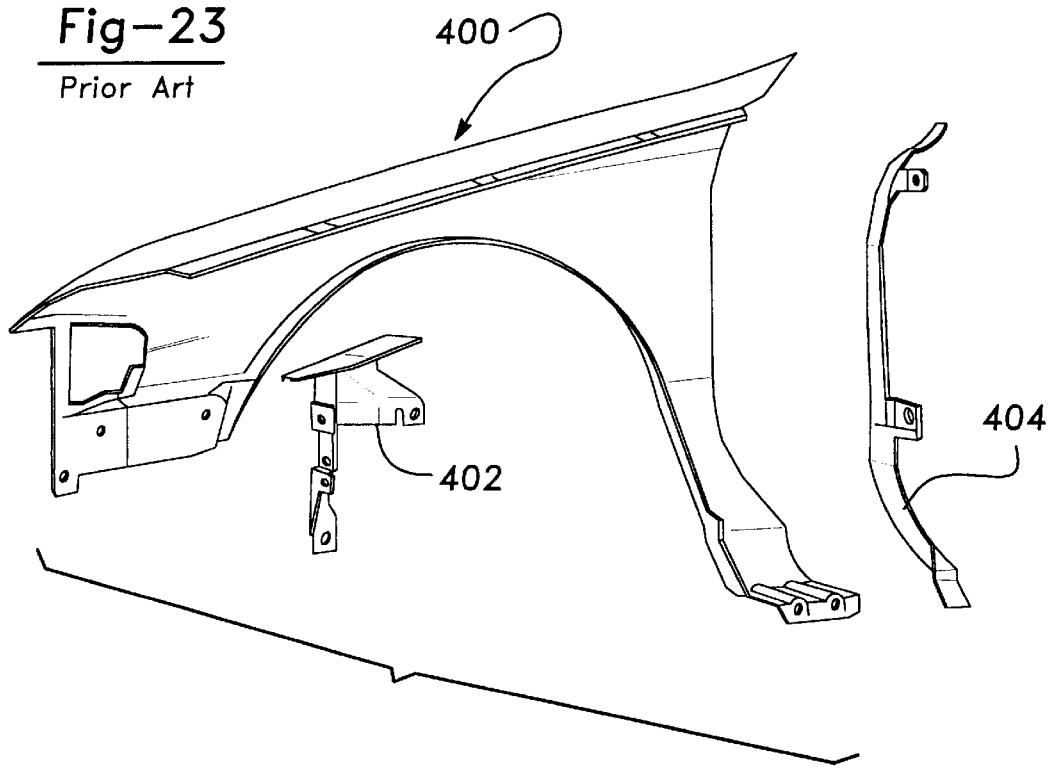
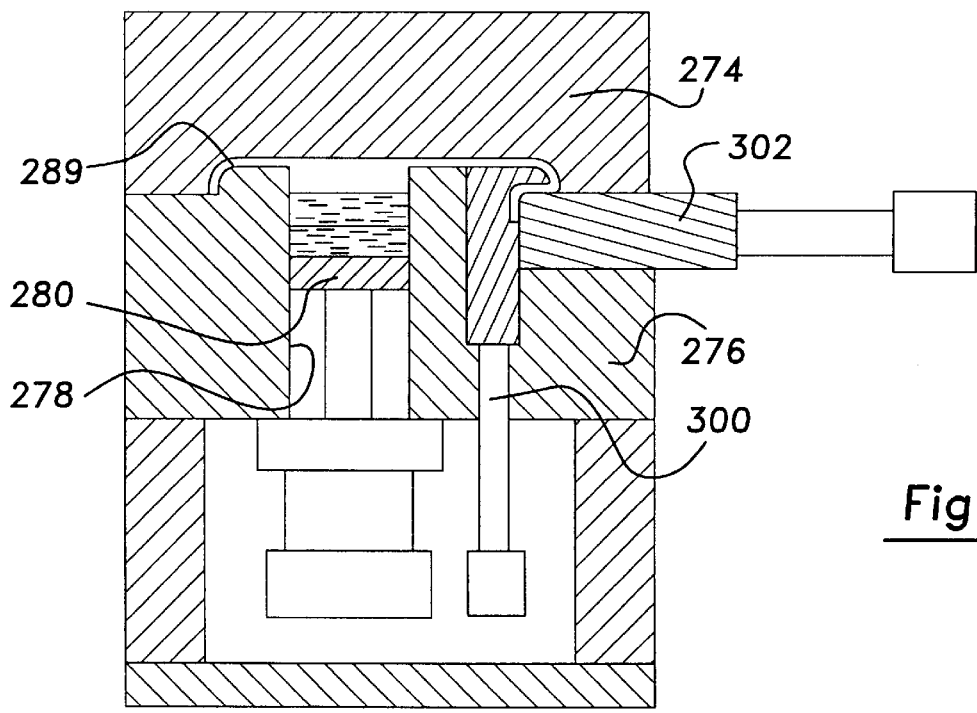

AUTOMATED THERMOSET MOLDING APPARATUS

This is a division of U.S. patent application Ser. No. 08/521,607, filed Aug. 30, 1995 and now U.S. Pat. No. 5,753,164.

BACKGROUND OF THE INVENTION

1. Technical Field

This invention relates to a method and an apparatus for the formation of fiber reinforced polymerized components.

2. Discussion

Fiber reinforced plastic (FRP) parts are being increasingly considered for use in a wide variety of applications. An FRP part generally consists of a plastic shape in which carbon, glass fiber, or other reinforcing fibers are dispersed in order to provide strength to the resin.

FRP products made from thermosetting resins, particularly in sheet molded compound (SMC) form can be formulated to have critical characteristics that are similar to the steel parts they are intended to replace. For example, SMC parts generally have a coefficient of thermal expansion which is equivalent to that of steel and are able to sustain E-coat (metal protection) temperatures of 400 degrees F. Furthermore, SMC parts can be installed by mechanical fasteners or by bonding to metal in the production body shop of an original equipment manufacturer side-by-side with steel body panels.

There are also competing thermoplastic materials which can be used instead of thermosetting resins. A number of thermoplastic materials, both reinforced and non-reinforced, have been evaluated in the automotive industry for primarily vertical components such as fenders and outer door panels. This class of materials has generally been limited to vertical panels because their stiffness is not sufficient (even in the reinforced version) for horizontal panels such as hoods and decklids.

These attempts at using thermoplastics have not been totally successful because they are not compatible with the automotive assembly line processes as have been the thermosets. The thermoplastics generally have to be processed separately from the E-coat bake ovens, and require greater-than-desired gaps between mating surface panels to allow for their high coefficient of thermal expansion.

There are three primary processes to produce higher volume chopped fiber thermoset composite components, and there are features of each process which allow one to be the selected choice for a particular application. These three processes are compression molding, injection molding, and transfer molding.

In compression molding, a charge such as a sheet molded compound containing a curable resin is placed between upper and lower heated die members defining a mold cavity. The dies are then brought to a closed position during which the dies compress the charge causing it to flow and fill the mold cavity. After the resin cures, the dies are opened and the finished part is removed. Compression molding has been historically the process of choice in making fiber reinforced thermoset composite components which require surface finish, mechanical properties, and dimensional stability.

In thermoset injection molding, a plastic is injected into a cavity defined between two die halves. After cross-linking of the polymers is completed, the dies are separated and the finished part is ejected. Injection molding offers design flexibility benefits through enhanced part integration.

In transfer molding, a charge is deposited into a preheating transfer pot. A movable platform is used to drive the heated, flowable charge out of the transfer pot and through a series of channels into a plurality of mold cavities. Transfer molding is used for parts that are too small and intricate for compression molding.

Each approach of the known prior art suffers some disadvantages. Compression molding is relatively expensive. Injection molding and transfer molding cause severe degradation in mechanical properties of the resulting component because of deterioration in the integrity of the chopped fibers resulting from transportation of the material.

Accordingly, an apparatus and process which enables the molding of fiber reinforced plastic components of relatively high degrees of complexity without the strength of the resulting product being compromised because of deterioration of the fibers during the molding process remains wanting.

SUMMARY OF THE INVENTION

According to the broad teachings of this invention, an apparatus and a process for molding a relatively complex fiber reinforced component at a high rate of production and with a high degree of automation is disclosed. The process of the present invention is easily adaptable to automation and is cost effective.

Generally, the present invention incorporates a molding unit comprising two matched die halves. One of the die halves has a heated charge transfer pot within which is provided a movable platform. The present invention also incorporates a charge forming unit and a charge shuttle unit. The charge forming unit prepares a charge by positioning reinforcing fibers of about 1.0" in length within a resinous material. The charge shuttle unit delivers the formed charge to the transfer pot and on top of the movable platform. The charge shuttle unit includes a preheater for preheating the charge prior to its introduction into the molding unit.

Optionally but preferably, the molding unit also includes an extendible vacuum shroud and vacuum pump. When the shroud is in position, the pump operates to form a vacuum in the mold cavity and the transfer pot. The movable platform forces the stacked charge into the mold cavity and, after the cross-linking defining the step of polymerization is completed, the die halves are separated and the component is ready for removal.

A preferred alternate embodiment of the present invention incorporates as the charge forming unit a sheet forming unit, a cutting unit, and a layering unit. The sheet forming unit forms a sheet of thick molding compound (TMC) containing the thermosetting resin and fibers and lays down the TMC sheet onto a conveyor. The cutting unit is preferably a computer controlled cutting unit that cuts the sheet into programmed charge-size pieces or slabs. The layering unit includes a robotic arm that lifts and stacks the individual slabs to form a charge and deposits the charge in a shuttle ram of the charge shuttle unit for delivery into the molding unit. In either embodiment, by providing a charge consisting of a resin that flows readily when heated and having relatively long fibers that enter the mold cavity undamaged, the present invention overcomes many of the disadvantages of the prior art.

The fibers of the present invention may be carbon, glass fiber, or other materials. The fibers are dispersed into a thermosetting resin which may also contain fillers and other components normally found in a sheet molding compound. The charge is in the form of at least one slab of fiber-reinforced resin. The fibers preferably are randomly oriented in parallel horizontal planes within the slab. The charge is introduced into the cavity such that the fiber integrity is essentially undisturbed from initial charge forming through final curing.

A component produced according to the present invention demonstrates good surface finish, mechanical properties, and dimensional stability.

The present invention has significant advantages over the prior art. Relatively long reinforcing fibers (typically 1.0") are randomly oriented in parallel horizontal planes within the resin forming the charge of the present invention. The fibers retain their initial lengths even in the final product. Conversely, fiber-reinforced products produced by injection molding incorporate shortened, damaged fibers caused by the transportation of the fiber-reinforced material including being forced through the openings of injection nozzles of conventional injection molding machines, being so small that damage to the reinforcing fibers results as the fibers pass through and from the injection barrel into the mold cavity. Conversely, the orifice through which the charge enters the mold cavity of the present invention is considerably larger than that of known injection molding nozzles, and fibers of 1.0" lengths pass readily through the orifice without damage.

Furthermore, fibers being injected with a resin from conventional injection molding machine nozzles suffer further damage on entry into the mold cavity as often they are forced to pass at an extreme angle (90 degrees) from the nozzle into the mold. Conversely, and with respect to the present invention, because the horizontal orientation of the fibers of the charge prior to injection generally matches the local plane of the mold cavity, the fibers do not have to pass angularly from the transfer pot into the mold cavity.

Because the fibers are introduced into the mold cavity essentially undisturbed, it is possible to produce components demonstrating mechanical properties comparable to those produced by compression molding. Yet unlike compression molding where the charge is manually or robotically placed on the lower die so that it covers between about 15–50 percent of the total molding surface and about 35–50 percent of the mold surface for most exterior automotive body panels, the charge of the present invention is conveniently introduced into the cavity through a transfer pot formed in one of the die halves and covers only about 1–5 percent of the mold surface area for structural components and about 1–20 percent for surface panels.

The apparatus of the present invention offers several other advantages over the prior art. In addition to eliminating deterioration of reinforcing fibers which accompanies known methods of forming complex plastic parts, time and cost savings may be achieved by using the process of the present invention as a single complex part may now be molded in a single operation. Because of the above-mentioned fiber deterioration, injection molding is impractical to produce an exterior part such as a fender for a vehicle where structural integrity as well as surface finish are critical.

Compression molding has been employed to produce such parts. Taking a front fender for a vehicle as an example of a part produced by compression molding, the nose piece and the rear reinforcement are molded separately from the fender skin and are later attached to the skin by a secondary operation. In addition, because compression molding forms a membrane over desired holes during the production process, drilling must also be undertaken as a secondary operation. The present invention substantially eliminates these secondary processes. Specifically, because the present invention demonstrates the flexibility of injection molding without compromising fiber integrity, supporting components may be molded with an outer skin in the same operation. Holes, slots, and openings can be molded in the part during the molding operation, thus eliminating (or minimizing) secondary operations.

Accordingly, advantages of the present invention over prior art approaches to molding fiber reinforced parts includes reduction of cycle time, the reduction of the number of necessary tools, and the attendant reduction of manpower. Yet still other advantages exist. For example, a part molded according to the present invention is molded to stops, unlike some molding techniques where the amount of material and its rheology properties control the relative location of the two matched dies, thus assuring a finished part that is more consistent in terms of weight and part thickness. Furthermore, for surfaces of components which are nearly vertical (adjacent to, for example, fenders and outer door panels), compression molding often is unable to adequately develop the pressure needed for a quality composite laminate. Conversely, according to the present invention, the molding pressure is more uniform due to its hydrostatic nature.

BRIEF DESCRIPTION OF THE DRAWINGS

The present invention will be more fully understood by reference to the following detailed description of the preferred embodiments of the present invention when read in conjunction with the accompanying drawings, in which like reference characters refer to like parts throughout the views, and in which:

FIG. 11 is a side elevational view of the molding apparatus according to the present invention showing the molding halves in their open position and a stacked charge positioned within the preheater;

FIG. 12 is a view similar to that of FIG. 11 but illustrating the upper die moved to its closed position with respect to the lower die and showing the cover of the preheater also in its closed position;

FIG. 15 is a view similar to that of FIG. 14 but showing the charge having been distributed within the mold cavity;

FIG. 16 is a view similar to that of FIG. 15 but showing both the shroud and the upper die in their retracted positions and the molded part being ejected;

FIG. 19 is a sectional view similar to that of FIGS. 18A–18C but without the charge in place and illustrating a preferred method of forming angular portions of the molded component;

FIG. 23 is an exploded perspective view of the interior of a fender produced according to prior art techniques and illustrating the separate structural components.

DETAILED DESCRIPTION OF THE PREFERRED EMBODIMENT

It should be understood from the outset that the scope of the present invention need not be limited to the particular example used in connection with this invention since those skilled in the art will appreciate that its teachings can be used in a wide variety of applications.

As noted before, there are several processes that have been used in the past for the molding of reinforced thermosets. Specifically, for the processing of chopped fiber reinforced thermosets there are three primary higher volume processes currently in production which are typically referred to as matched mold methods. These include compression molding, injection molding, and transfer molding. It has been estimated that of all thermoset parts currently being produced (both reinforced and non-reinforced, including non-automotive applications), ten percent (by material weight) are transfer molded, sixty percent are injection molded, and thirty percent are compression molded. Other processes do exist such as the combination of injection and compression molding, as well as the liquid resin transfer processes which are typically lumped together and known as liquid molding.

Figure 1:
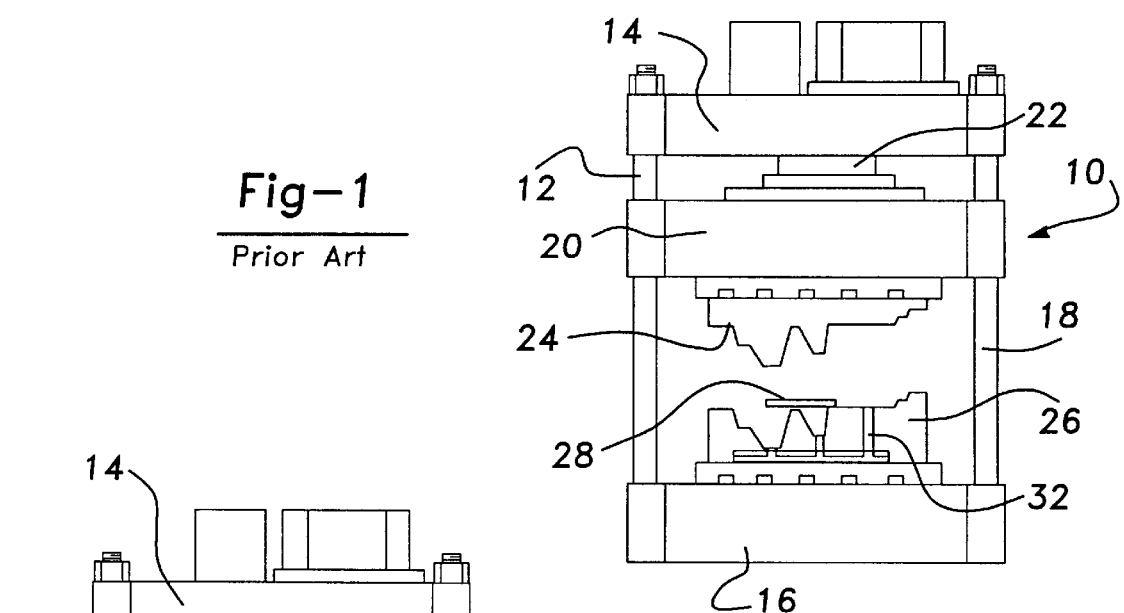
FIG. 1 is a side elevational view of a compression molding apparatus according to the prior art shown in its load position.
Figure 2:
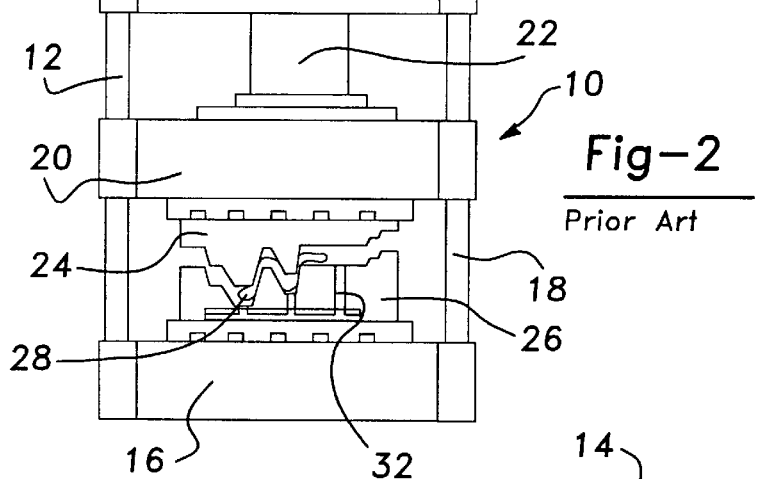
FIG. 2 is a view similar to that of FIG. 1 of a compression molding apparatus according to the prior art but shown moving toward its closed position.
Figure 3:
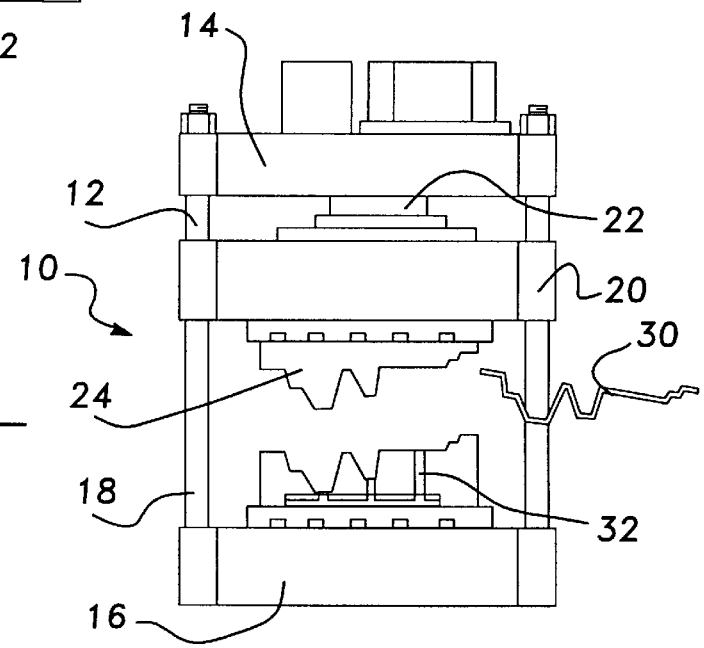
FIG. 3 is a view similar to that of FIG. 2 of a compression molding apparatus according to the prior art but shown in its open position with a molded part being ejected.
Figure 4:
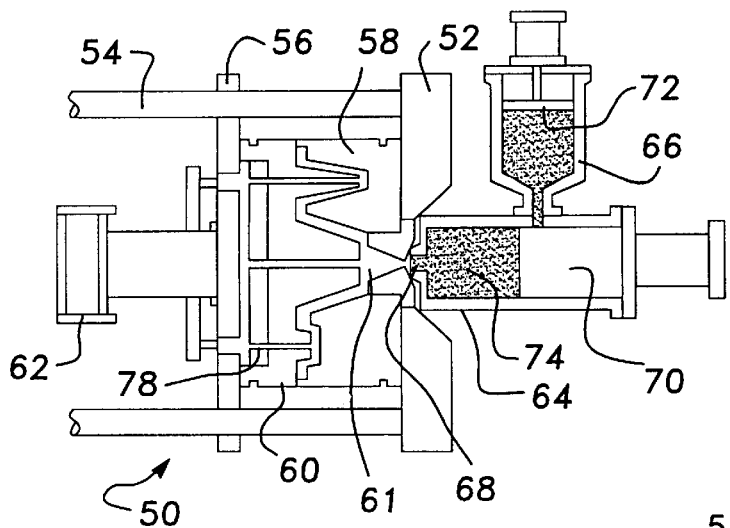
FIG. 4 is a side elevational view of an injection molding apparatus according to the prior art shown in its closed position and with the fluidized plastic material awaiting injection.
Figure 5:
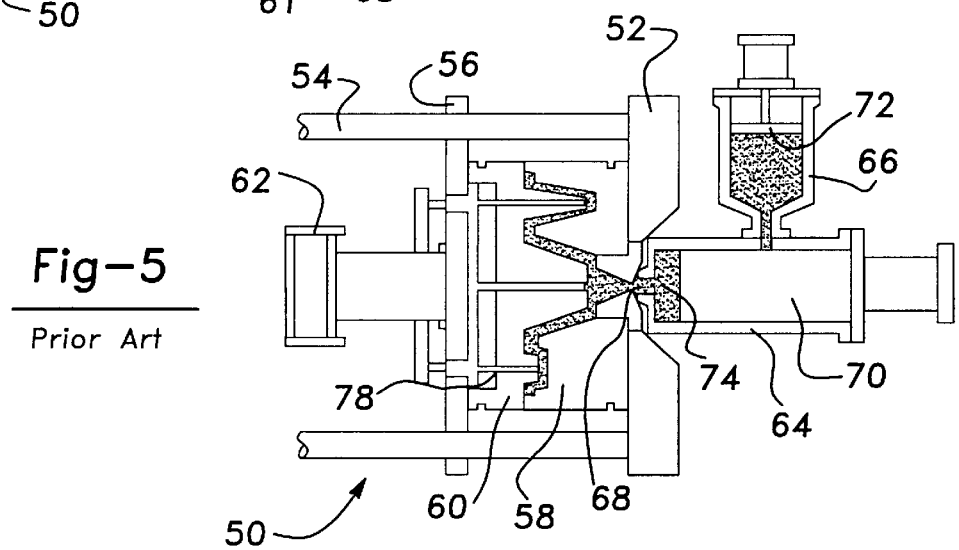
FIG. 5 is a view similar to that of FIG. 4 of an injection molding apparatus according to the prior art but showing the fluidized plastic material being injected.
Figure 6:
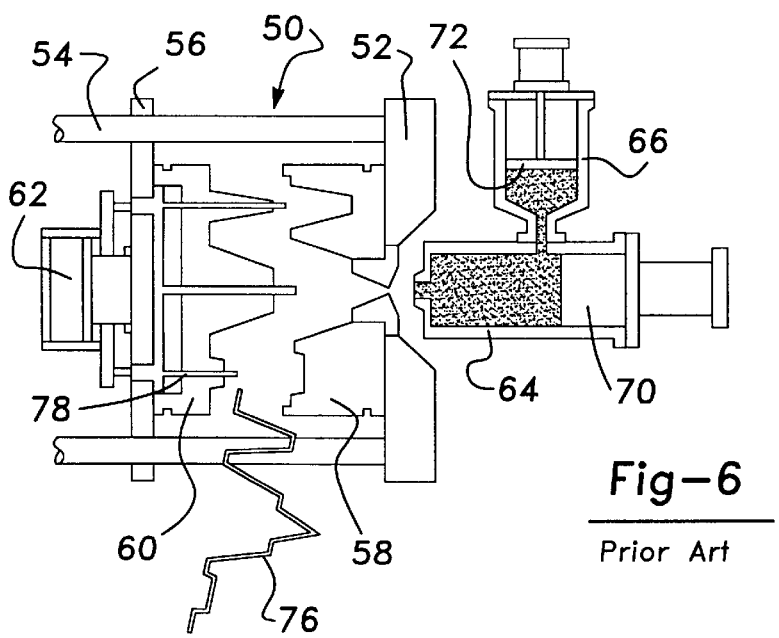
FIG. 6 is a view similar to that of FIG. 5 of an injection molding apparatus according to the prior art but shown in its open position with a molded part being ejected.

FIGS. 1 through 6 demonstrate the prior art systems for processing fiber reinforced thermosets into molded body panels and related parts. FIGS. 1 through 3 illustrate an exemplary apparatus and method for compression molding. FIGS. 4 through 6 illustrate an exemplary apparatus and method for injection molding. (Transfer molding, discussed above, is also used for producing molded reinforced parts, but is generally limited to the production of intricate small parts and is generally unsuited for the production of vehicle panels.)

With respect to the prior art apparatus and method for compression molding illustrated in FIGS. 1 through 3, an exemplary compression molding apparatus is shown and is generally illustrated as 10. Generally the compression molding process consists of manually positioning a charge of a plastic material between matched upper and lower dies, and closing the dies under pressure. The dies are heated to accelerate chemical cross-linking of the thermosetting plastic. The resulting part assumes the shape of the mold cavity defined between the upper and lower dies.

The apparatus 10 includes a frame 12 that comprises an upper fixed horizontal member 14, a lower fixed horizontal member 16, and a plurality of vertical supporting members 18. A movable horizontal member 20 is supported on the vertical supporting members 18. A hydraulic driver assembly 22 movably connects the movable horizontal member 20 to the upper fixed horizontal member 14 for selective upward and downward movement of the movable horizontal member 20 with respect to the upper fixed horizontal member 14.

Fitted to the lower side of the movable horizontal member 20 is a heated upper die 24. Fitted to the upper side of the lower fixed horizontal member 16 is a heated lower die 26. The dies 24 and 26 are matched such that a mold cavity is defined therebetween when the two dies 24 and 26 are at their closest operating proximity during the molding process.

In operation, a weighed charge 28 of sheet molding compound consisting of a chopped fiber-reinforced thermosetting plastic is positioned between the upper die 24 and the lower die 26 when the two halves are in their open position as illustrated in FIG. 1. The two dies 24 and 26 of the apparatus 10 are then closed and pressure is applied to the charge 28. The beginning of the compression process is illustrated in FIG. 2. Depending on the thickness and shape of the desired part, cycle times can range from less than a minute to several minutes. After adequate cycle time, the upper die 24 is returned to its open position as illustrated in FIG. 3 and a finished part 30 is ejected by means of ejector pins 32 operably positioned within the lower die 26.

Because the sheet molding compound is still flowing while the tool is being closed, shear edges (not shown) at the edge of the part must be used to insure that the cavity is sealed. The use of shear edges force the use of squared component edges and limit the use of slides (also not shown) near the edges of the part. Because the presses used in the conventional compression molding operation are of the vertical type as illustrated by the apparatus 10, the moldings usually cannot have undercuts that would make it difficult to extract the molding from the cavity without the use of these moving slides.

With respect to the prior art apparatus and method for injection molding of thermosets illustrated in FIGS. 4 through 6, an exemplary injection molding apparatus is shown and is generally illustrated as 50. In general, the injection molding process comprises of the steps of delivering thermosetting plastic compound to a relatively cool injection chamber and driving the material from the injection chamber by a plunger or screw into a relatively hot injection mold where the plastic compound is cured to form a component.

The apparatus 50 includes a fixed cross member 52 and a plurality of supporting members 54. A movable cross member 56 is movably positioned on the supporting members 54. A first die 58 is fitted to the fixed cross member 52. A second die 60 is fitted to the movable cross member 56. The dies 58 and 60 are matched such that a mold cavity 61 is defined therebetween when the dies 58 and 60 are brought to their closest proximity during the molding process. A mold driver 62 drives the movable cross member 56 and its associated second die 60 between the dies' open and closed positions.

A barrel 64 is mounted to the fixed cross member 52. A hopper 66 is mounted to the barrel 64. The barrel 64 includes a nozzle end 68 that is in fluid communication with the mold cavity 61. An injector member 70 (such as a ram or a screw) is movably provided within the barrel 64. Similarly, a pusher member 72 is movably provided within the hopper 66.

In operation, the second die 60 is positioned adjacent the first die 58 to define the cavity 61 therebetween, as illustrated in FIG. 4. Thereafter, a quantity 74 of thermoset molding compound is injected into the cavity 61 by the force of the injector member 70 as illustrated in FIG. 5. The first and second dies 58 and 60, respectively, are heated relative to the barrel 64. (The mold temperature is generally elevated to between 300 and 325 degrees F.) The heat and pressure produced by the force of the injector member 70 act to cure the molded article. After injection is completed, the quantity of plastic material (bulk molding compound) is replenished by the introduction of material into the barrel 64 from the hopper 66.

Cure time is approximately the same as for compression molded parts of equivalent thicknesses, although the overall cycle time of injection molding a part is shorter than that for compression molding. The formation of a molded part 76 is completed following the appropriate cure time, and, after the first and second dies 58 and 60, respectively, are moved apart, the molded part 76 is ejected with the assistance of ejector pins 78.

Figure 7:
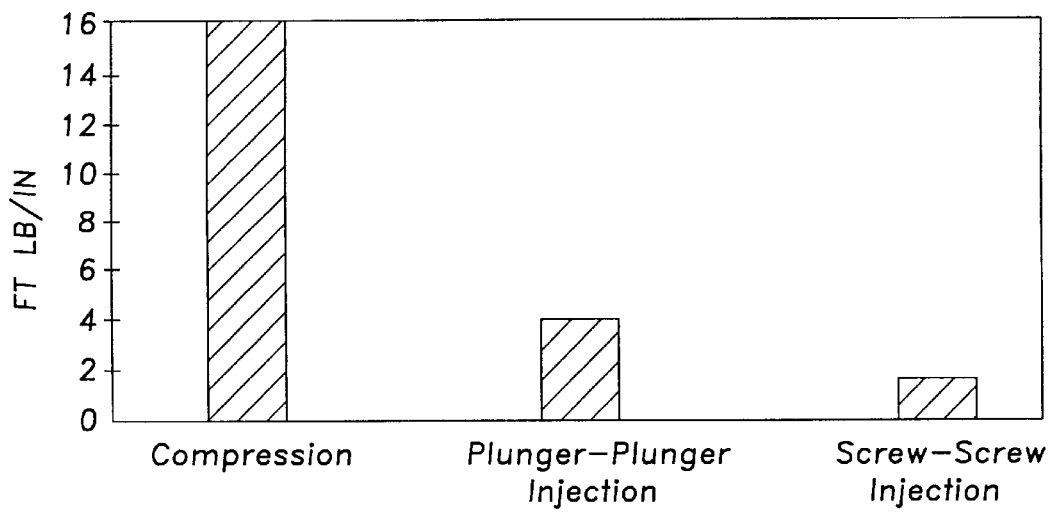
FIG. 7 is a graph illustrating Izod impact comparisons of compression molding and injection molding.
Figure 8:
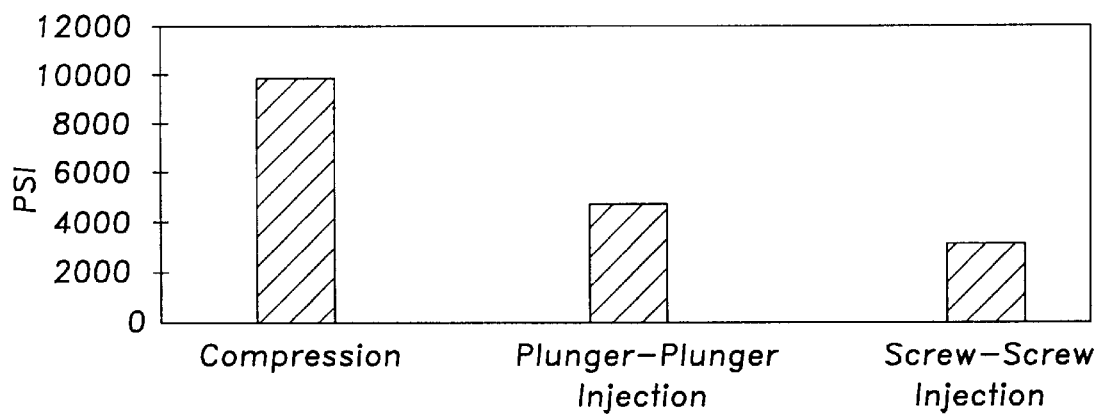
FIG. 8 is a graph illustrating tensile strength comparisons of compression molding and injection molding.

The major differences between compression molding and injection molding of thermoset molding compounds are the mechanical properties that are obtained in the molded part. For example, FIGS. 7 and 8 illustrate Izod impact and tensile strength comparisons for compression molding compared to injection molding for the same glass fiber content. Two feed mechanisms are identified along the X-axis for the injection molding process, plunger/plunger and screw/screw, which relate to the means by which the bulk molding compound is first transported from the hopper to the injection chamber and then from the injection chamber into the molding cavity. While properties for transfer molding are not readily available due to the typically small size of the molded parts, the resultant mechanical properties can be assumed to fall between those for compression and injection molding.

Figure 9:
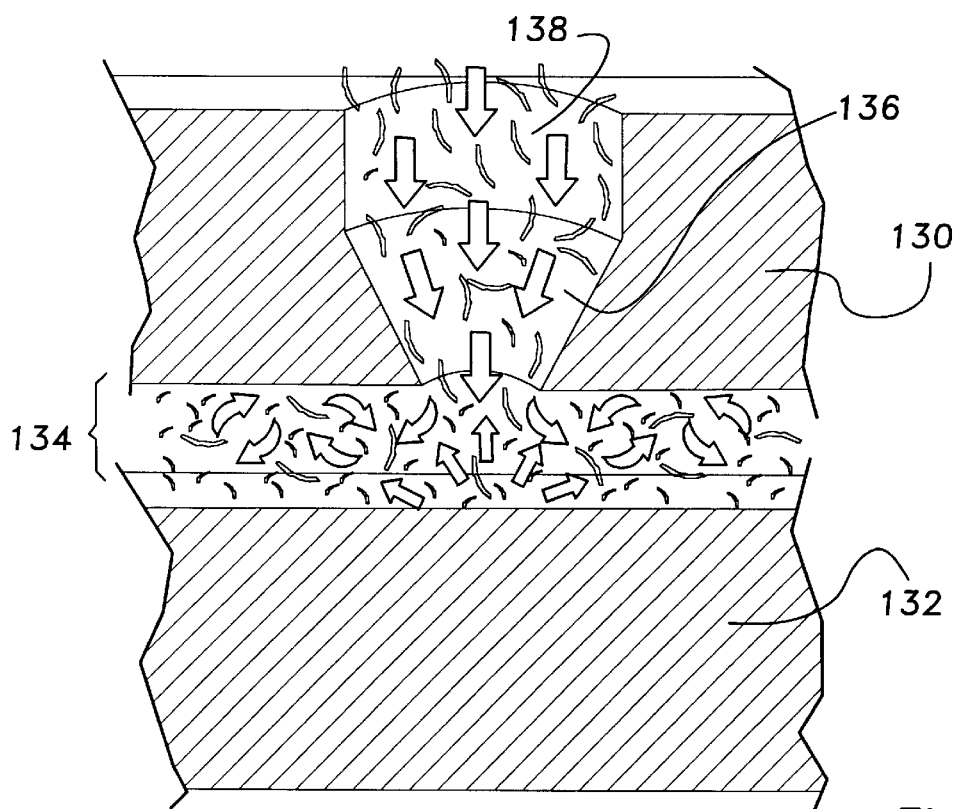
FIG. 9 is a cross-sectional, partial view of a mold cavity of a prior art injection molding apparatus defined by adjacent die halves with one of the halves having an injection gate formed therein and illustrating the injection of plastic and reinforcing fibers.

The significant results of FIGS. 7 and 8 are the 75 percent reduction in notched impact strength and the 60 percent reduction in tensile strength that are typically observed when injection molding is compared to compression molding. This degradation in mechanical properties with injection molding results from damage to the reinforcing fiber as a result of the injection process. FIG. 9 dramatically illustrates how fiber damage occurs according to conventional molding processes. In this figure, a cross-sectional, partial view of a mold cavity of a prior art molding apparatus illustrates a first die 130 and an adjacent die 132. A mold cavity 134 is defined between the two dies. An injection gate 136 is formed through the first die 130.

A quantity 138 of a flowable plastic material having reinforcing fibers is illustrated passing through the gate 136 and into the cavity 134. As shown, many of the fibers are damaged during the injection process. Fiber damage has several causes, and includes the compound being transported from one location in the process to another (with the screw transportation being more severe than a plunger as demonstrated in FIGS. 7 and 8), injection of the material through the small gate 136, impacting the opposite surface of the tool as the material is forced to change direction ninety degrees immediately upon exiting the injection gate 136, and the extensive flow in the mold as the material is often injected at one end of the mold and must thereafter flow to the opposite end of the cavity 134.

The present invention overcomes the difficulties of compression molding and injection molding apparatus of the prior art. The present invention prevents damage to the reinforcing fibers by using a prepared charge which passes through an effective injection orifice that is large compared to the injection molding nozzle opening. Furthermore, in addition to the damage caused as the fibers pass through the small orifice of the injection molding nozzle, further damage results as the fibers move at a 90 degree angle as they pass from the nozzle tip into the relatively perpendicular mold cavity. Conversely, because the fibers of the charge according to the present invention are pre-positioned in random orientation in parallel horizontal planes which are always parallel to the direction of initial flow, damage of the fibers during distribution of the resin within the mold cavity is also virtually eliminated.

Figure 10A:
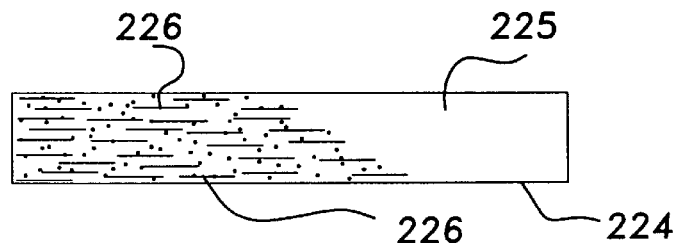
FIG. 10A is a cross sectional view of a single layer of fiber reinforced plastic material according to the present invention.
Figure 10:
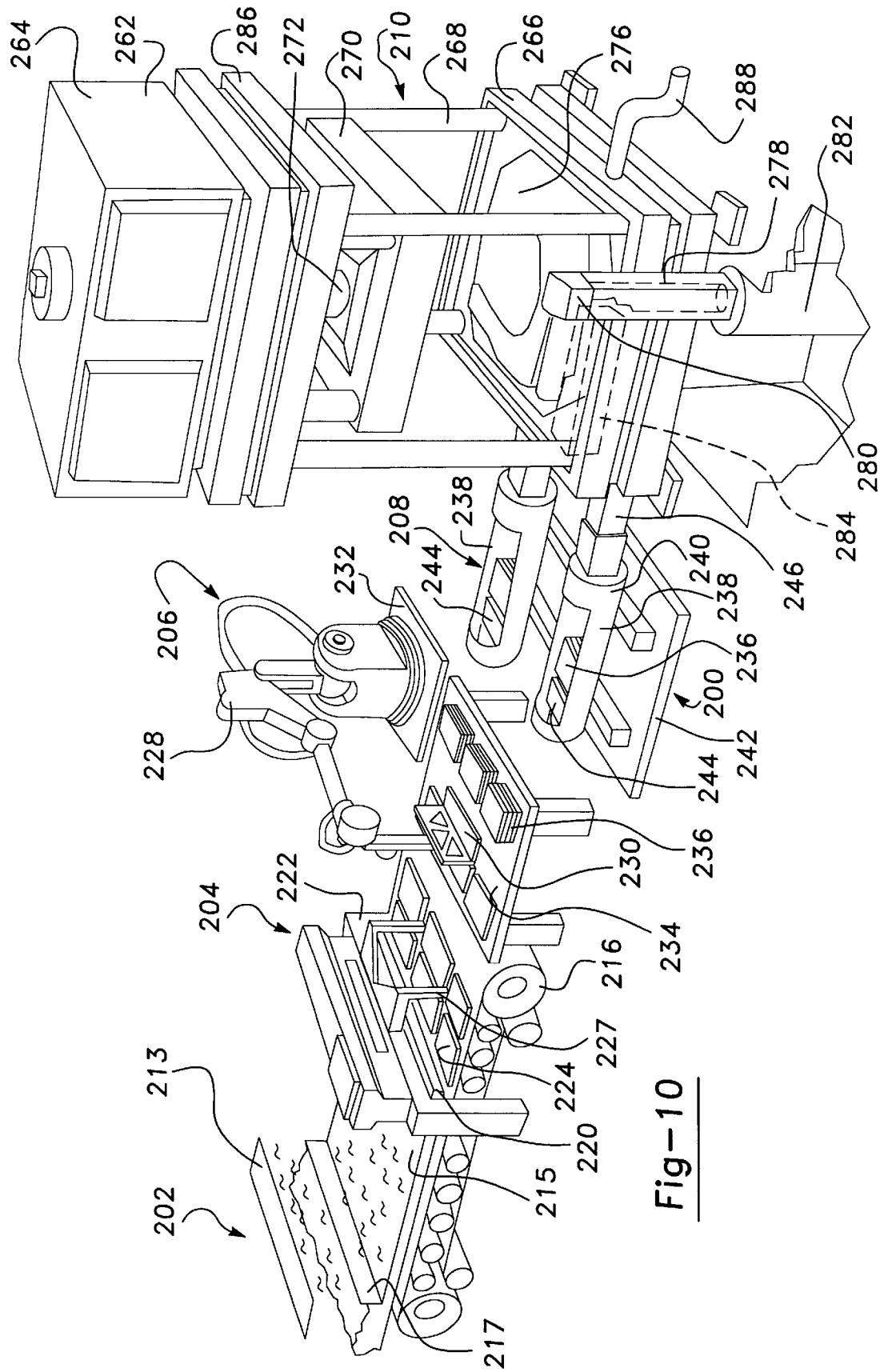
FIG. 10 is a perspective view of the charge preparation and molding apparatus according to the present invention.

With respect to FIG. 10, a transfer/injection molding apparatus is shown generally as 200. The apparatus 200 includes a sheet forming unit 202, a cutting unit 204, a layering unit 206, a charge shuttle unit 208, and a molding unit 210. A sheet 215 of resin paste is formed in substantially the same manner as sheet molding compound (SMC) is made in the industry although, perhaps, slightly thicker. A doctoring blade 217 controls the thickness of the resin paste and reinforcing fibers fall from choppers 213 onto the resin so that they all lie parallel to the major surface of the sheet (i.e., the horizontal plane) yet are randomly oriented in that plane.

The sheet of plastic material is passed into the cutting unit 204. The cutting unit 204 is controlled by a programmable computer (not shown) such that the resulting cut charges are formed according to selected, pre-programmed sizes. An elongated reciprocating cutting blade 220 supported by a frame 222 cuts the sheet into a plurality of regularly sized square or rectangular slabs 224 of thick molding compound. Each of the slabs 224 comprises a plastic portion 225 having interspersed reinforcing fibers 226 which are randomly dispersed but which are parallel to the sheet 215 as illustrated in FIG. 10A. An aligner 227 maintains the slabs 224 in a regular order on the conveyor 216 for delivery to the layering unit 206.

For purposes of this invention, the term "charge" means a material containing a resin that cures to a rigid, solid state. The charge as used herein comprises at least one slab, and typically comprises a plurality of layered slabs. The charge may be either square or oblong and may, in fact, embody a great variety of length-to-width ratios. The resin that may be used may be any material that provides the necessary bonding and strength for the composite article to be formed. Among typical resins are polyesters, vinyl esters, novalacs and epoxies. Preferred resin materials are thermally cured polyester resins having a modified molding viscosity index and modified gelation characteristics to enhance in-cavity flow.

The thermosetting resin is mixed with reinforcing fibers and various fillers. The fibers may or may not be preoriented in the resin. Typical fibers include polyamide fibers, polyester fibers, natural fibers and metal fibers. Preferably, the fibers are glass fiber strands and carbon strands. Glass fibers are presently the most preferred. The length of the fibers is preferably between 0.5" and 1.0", with the greater length being most desired. Because of the size of the initial charge and the flow characteristics of the resin, the initial lengths of the fibers remain unchanged through forming of the part. This compares favorably with injection molding, where the longest fibers are 0.5" and are broken up after injection resulting in distribution of fiber length where the longest fibers are approximately 0.125", and with transfer molding, where the maximum initial length of the fibers in the charge is also 0.5" or less and where the final length of the fibers is considerably shorter, again due to breakage.

The layering unit 206 includes a robotic arm 228 or any other suitable form of automation having an L-bracket 230 at one end The robotic arm 228 is pivotably mounted on a supporting structure 232. A table 234 receives the slabs 224 from the conveyor 216. Using the L-bracket 230, the arm 228 moves each of the slabs 224 from the table 234 and stacks them to form multiply-layered charges 236.

The charge shuttle unit 208 includes a pair of twin transfer shuttles 238. The twin transfer shuttles 238 allow for charge loading of one while the other one is in the molding cycle. Each of the transfer shuttles 238 includes a preheating body 240 supported on a common reciprocating frame 242, a shuttle ram 244, and a closed transfer tube 246 for transferring the charge 236 between the shuttle 238 and the molding unit 210. The reciprocating frame 242 alternatingly moves each transfer shuttle 238 into alignment with a receiving passageway formed in the molding unit 210. After being stacked by the robotic arm 228 of the stacking unit 206, the charge 236 is moved by the arm 228 into the preheating body 240 where it is preheated for a given time. When the preheating cycle is completed one of the shuttle rams 244 positions the charge 236 into the molding unit 210 while the arm 228 simultaneously positions another charge 236 into the other of the shuttle rams 244.

The molding unit 210 includes a frame 262 that comprises an upper fixed horizontal member 264, a lower fixed horizontal member 266, and a plurality of vertical supporting members 268. A movable horizontal member 270 is supported on the vertical supporting members 268. A hydraulic driver assembly 272 movably connects the upper fixed horizontal member 264 to the movable horizontal member 270 for selective upward and downward movement of the movable horizontal member 270 with respect to the upper fixed horizontal member 264.

Fitted to the lower side of the movable horizontal member 270 is a heated upper die 274 (seen in FIGS. 11 through 16). Fitted to the upper side of the lower fixed horizontal member 266 is a heated lower die 276. The dies 274 and 276 are matched such that a mold cavity is defined therebetween when the two dies 274 and 276 are brought to their stops at their closest operating proximity.

A vertical passageway or transfer pot 278 is formed in the lower fixed horizontal member 266 and includes therein a vertically movable platform 280. The passageway 278 terminates at a charge entrance 279 (seen in FIGS. 11–16) defined in the cavity-side of the lower die 276. The charge entrance 279 is shown as being generally centrally located in the mold cavity, although this need not be the case.

The charge entrance 279 defines an opening which represents about 1–5 percent of the mold's surface area in the case of structural components and about 1–20 percent in the case of exterior body panels. The initial orientation of the fibers on entry into the mold cavity is approximately parallel with the molding surfaces of the cavity and maintain this orientation as the resinous carrier fills the cavity. The fibers are thus undamaged throughout the molding process.

The platform 280 is driven by a platform driver 282. A horizontal passageway 284 is also formed in the lower fixed horizontal member 266 between the closed transfer tube 246 of the shuttle unit 208 for transporting the stacked charge 236 into the molding unit 210.

The molding unit 210 includes provisions for a vacuum chamber to be temporarily formed around the mold cavity. A Class "A" molded surface, which is required for exterior automotive body panels, involves the ability to mold a composite structure whose show surface is an exact duplicate of the mold surface without any distortions or surface imperfections. The longer the flow distance, the greater the opportunity for surface imperfections, especially long term waviness. The use of vacuum can greatly assist in the prevention of some types of surface imperfections. Accordingly, a vacuum is preferably used in conjunction with the mold process of the present invention.

In the preferred embodiment, a sealing shroud 286 is fitted to the upper fixed horizontal member 264. After the two dies 274 and 276 are moved to their stopped position, the sealing shroud 286 extends to sealingly contact the upper side of the lower fixed horizontal member 266. A vacuum line 288 connected to a vacuum pump (not shown) is provided to draw a vacuum around the mold cavity during the molding operation. More details on the vacuum process in relation to molding may be found in the following United States patents, commonly assigned to the assignee of the present application, and all incorporated by reference: U.S. Pat. No. 4,488,862, issued on Dec. 18, 1984 to Epel et al. for COMPRESSION MOLDING APPARATUS HAVING VACUUM CHAMBER; U.S. Pat. No. 4,551,085, issued on Nov. 5, 1985 to Epel et al. for COMPRESSION MOLDING APPARATUS HAVING VACUUM CHAMBER; U.S. Pat. No. 4,612,149, issued on Sep. 16, 1986 to Iseler et al. for COMPRESSION MOLDING A CHARGE USING VACUUM; U.S. Pat. No. 4,855,097, issued Aug. 8, 1989 to Iseler et al. for COMPRESSION MOLDING A CHARGE USING A VACUUM; and U.S. Pat. No. 5,130,071, issued on Jul. 14, 1992 to Iseler et al. for VACUUM COMPRESSION MOLDING METHOD USING PREHEATED CHARGE.

FIGS. 11 through 16 illustrate the preferred steps of operation of the molding unit 210 of the present invention. It should be understood that the steps according to the following description are merely exemplary and modifications to the following steps may be made by one skilled in the art without deviating from the spirit or scope of the present invention.

With respect to FIG. 11, the upper die 274 is moved to its open position defined by its spaced apart relation with respect to the lower die 276. The vacuum shroud 286 is in its retracted position, and the robotic arm 228 positions the charge 236 in the preheating body 240 of one of the twin transfer shuttles 238 for preheating. Additional preheating of the charge 236 prior to is preheating by the preheating body 240 may be made by an additional preheater (not shown). It should be understood that because the shuttle unit 208 preferably comprises twin transfer shuttles 238, during normal operation a charge 236 would be positioned in the preheating body for preheating while a part was being molded in the molding unit 210. However, for the sake of clarity, the procedure is being described as only a single molding procedure.

With respect to FIG. 12, the charge 236 continues to be preheated within the preheating body 240 while the upper die 274 is moved into position above the lower die 276, thereby defining a cavity 289 therebetween. Movement of the upper die 274 and the lower die 276 is halted by mold stops which precisely define the size of the cavity 289. Because the upper die 274 and the lower die 276 are in their closed positions prior to the molding operation, no shear edges are required, thus allowing for the production of relatively intricate parts. One or more overflow channels 287 are formed in the mold to allow passage of excess charge material. Excess material (not shown) may be trimmed away after the molding process is completed.

Figure 13:
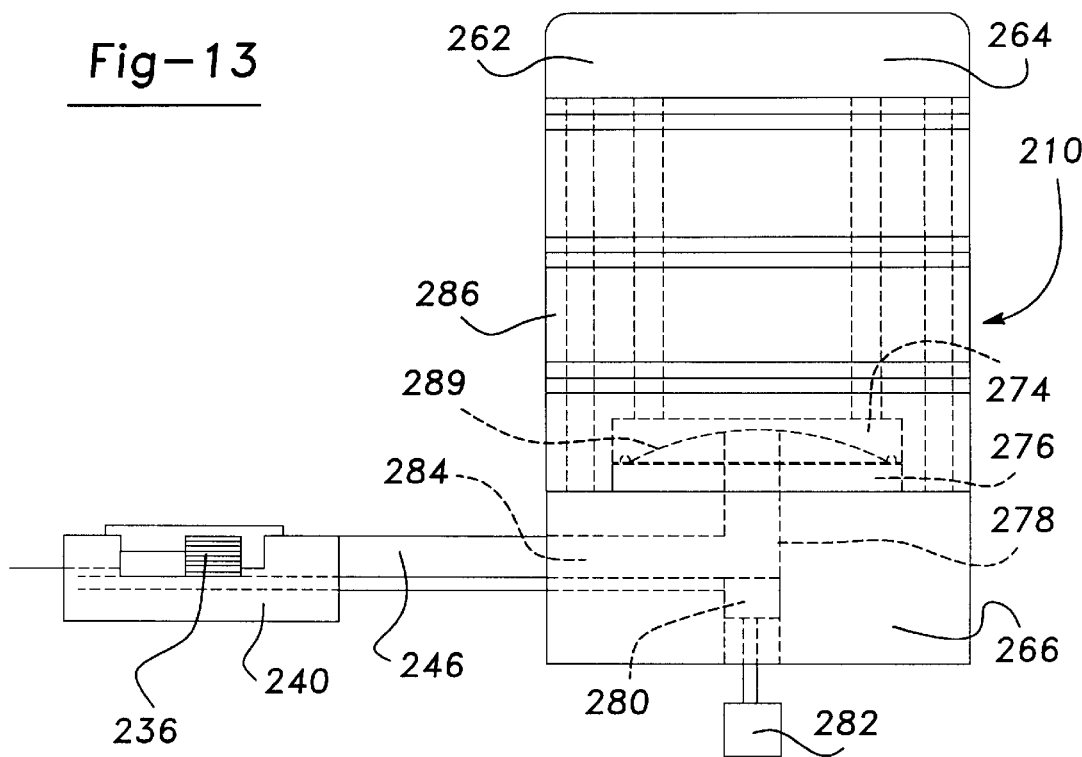
FIG. 13 is a view similar to that of FIG. 12 but illustrating the mold vacuum shroud in its extended and sealing position.

With respect to FIG. 13, the vacuum shroud 286 is moved to its extended, sealing and vacuum-forming position. The lower end of the shroud 286 is sealingly mated with the upper surface of the lower fixed horizontal member 266 to thereby form a temporary, vacuum-tight seal such that a vacuum may be formed around and in the cavity 289.

Figure 14:
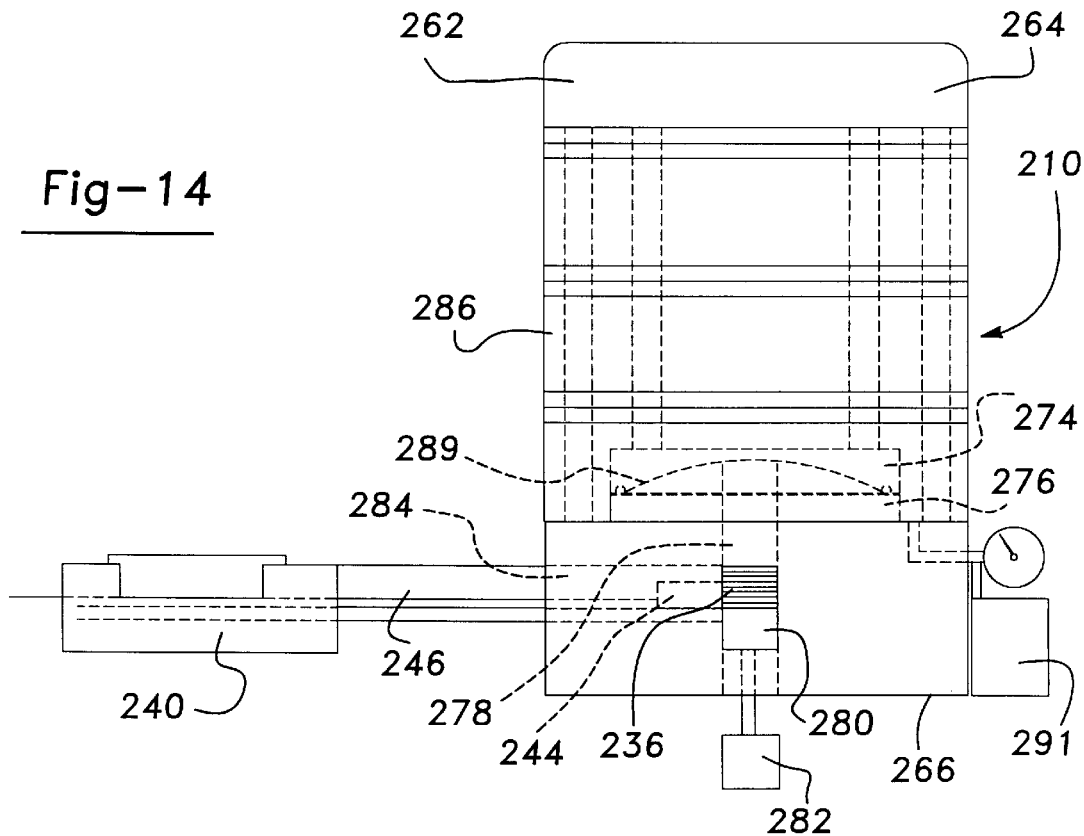
FIG. 14 is a view similar to that of FIG. 13 but illustrating the preheated stacked charge having been moved to its preinjection position above the movable platform.

With respect to FIG. 14, the preheated charge 236 has been moved in position by the shuttle ram 244. The preheated charge 236 passed from the preheating body 240 of one of the transfer shuttles 238 through the closed transfer tube 246 and the horizontal passageway 284 formed in the lower fixed horizontal member 266 and onto the upper surface of the platform 280. Once the charge 236 is in position on top of the platform 280, a vacuum pump 291 is engaged to create a temporary vacuum around the cavity 289. The inner wall of the shuttle ram 244 partially forms a fourth wall of the vertical passageway 278, thus enabling a vacuum to be formed within the cavity 289. The vacuum is useful in assuring that the flowable plastic is deposited completely into all of the crevices of the cavity 289.

With respect to FIG. 15, the platform 280 has been moved vertically into its compressing position, forcing the charge 236 (under a vacuum) into the cavity 289. The reinforcing fibers are distributed throughout the cavity 289 without deterioration or with minimal deterioration, as will be described more fully below.

With respect to the last step of the molding process of the present invention as illustrated in FIG. 16, a vacuum release valve (not shown) is opened to equalize the pressure within the vacuum shroud 286 with that of ambient air at any time after the mold cavity is filled. The vacuum shroud 286 is retracted as is the upper die 274. A finished part 292 is ejected, the ejection of which may be assisted by ejector pins as may be necessary depending on the particular component.

As noted above, the present invention overcomes the problem of deterioration of reinforcing attendant known plastic molding methods. Essentially the problem is overcome by providing a relatively large, multi-layered prepared charge having reinforcing fibers. The fibers are pre-positioned in each layer in parallel but otherwise random orientation, thereby assuring that the fibers will remain substantially parallel to each other and to the direction of initial flow as the charge enters the mold cavity.

Figure 17:
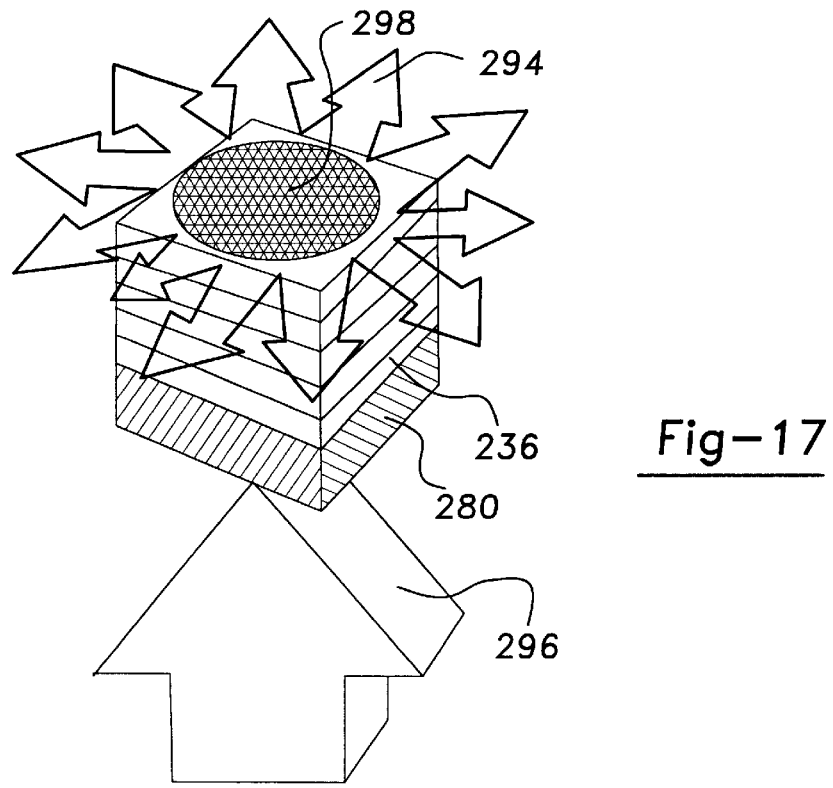
FIG. 17 is a schematic representation of a fiber-reinforced plastic charge and its general distribution pattern according to the present invention.

The principals which underlie the ability of the present invention to preserve the reinforcing fibers throughout the molding process are generally demonstrated in FIG. 17. In this figure, two dimensional flow of the material is illustrated by arrows 294, while pressure on the charge 236 effected by the platform 280 is illustrated as the arrow 296. By positioning the fibers 298 according to the layering process of the present invention so that the fibers lie substantially horizontally in the charge 236 in a plane which is always parallel to the initial direction of flow, there is no damage from the condition depicted in FIG. 9. The initial height of the charge 236 and the initial mold surface coverage are flow-related issues that are optimized on a case-by-case basis according to the part and the material.

Figure 18A:
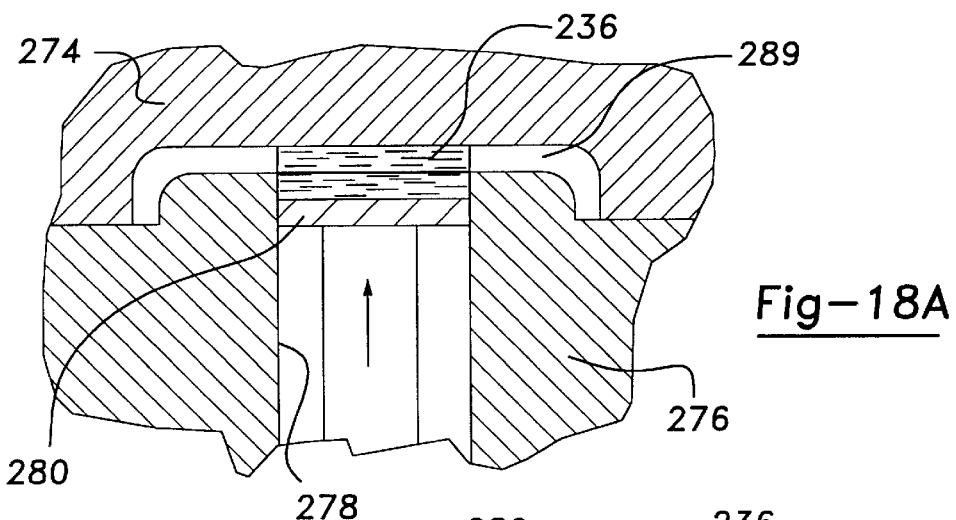
FIG. 18A is a sectional view taken of two die halves in their closed position with the charge positioned partially in the mold cavity.
Figure 18B:
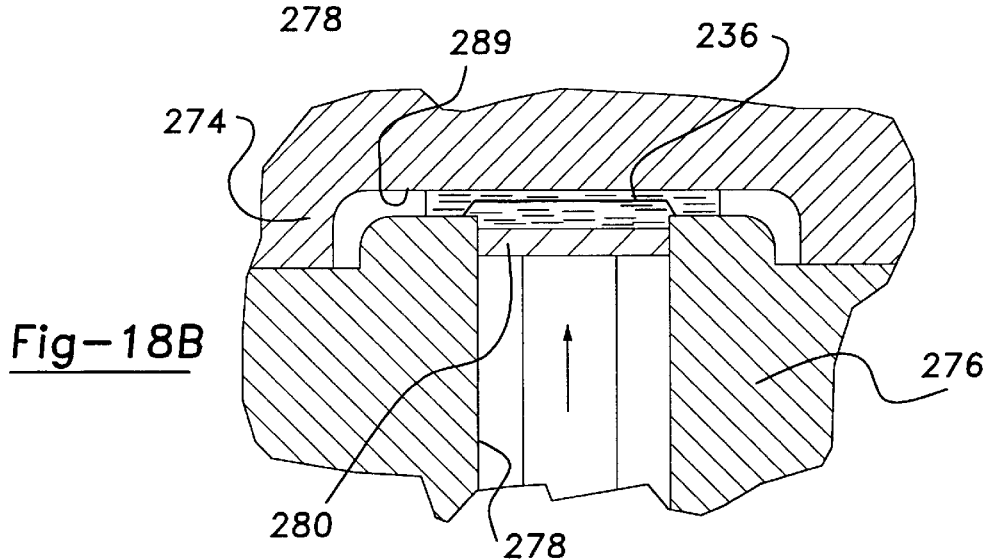
FIG. 18B is a sectional view similar to that of FIG. 18A but illustrating the charge beginning to be forced along the spaced defined by the mold cavity.
Figure 18C:
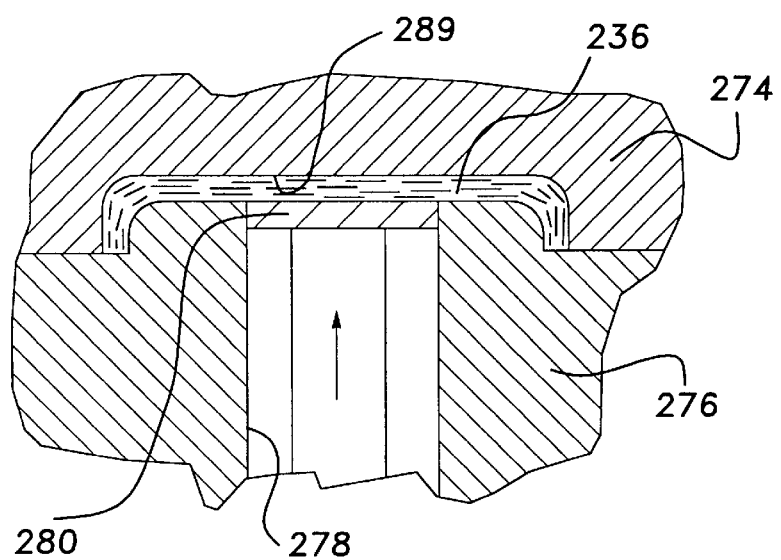
FIG. 18C is a sectional view similar to that of FIG. 18B but illustrating the charge fully injected into the mold cavity.

FIGS. 18A through 18C illustrate the progression of the charge 236 from the transfer pot 278 and into the cavity 289. With respect to these figures, the upper die 274 is closed upon the lower die 276 defining the mold cavity 289. The platform 280 is reciprocatingly positioned in the transfer pot 278.

In FIG. 18A, the platform 280 is in a retracted position where the charge 236 is positioned on the top of the upper surface of the platform 280 and is in contact with the cavity surface of the upper die 274. It is to be understood that the general configuration of both the charge 236 and the platform 280 is only exemplary and is not intended as being limiting. For example, while the charge 236 as shown comprises any two slabs layered one atop the other, the charge 236 may comprise any one slab or may be more than the two illustrated. The horizontal configuration of the fibers is clearly seen in the charge 236.

FIG. 18B illustrates the next step of the injection process where the platform 280 has continued to move against the bottom of the charge 236 such that the top of the charge 236 has begun to spread out through the cavity. The fibers, however, remain roughly parallel with the upper and lower mold surfaces defining the cavity 289 or as clearly seen in FIG. 18B. In addition, the charge may be cylindrical shaped.

FIG. 18C illustrates the final step of the injection process wherein the platform 280 is in its fully extended, top dead-center position and the charge 236 is fully injected into the cavity 289. In this position, the upper surface of the platform 280 acts as part of the cavity wall of the lower die 276. The fibers have retained their substantially horizontal configuration and remain largely intact.

Prevention of damage to the fibers is related to the value of the "effective injection nozzle" for placement of the resin and fibers into the cavity. FIGS. 18A through 18C illustrate the relatively wide "injection opening" of the transfer pot 278. While the tip opening of the injection nozzle of the conventional injection molding apparatus varies depending on the application, the opening is generally no more than 0.50" in diameter. Accordingly, the value of the "effective injection nozzle" of the largest injection molding apparatus is equal to $0.25"^2 \times \pi$, or approximately $0.2"^2$.

Conversely, the value of the "effective injection nozzle" of the present invention is considerably larger than the same value of the prior art injection molding apparatus. Given, for example, a charge having a perimeter of 24.0" (representing 6.0" on each side) and a part thickness of, again for example, 0.1", the "effective injection nozzle" of the present invention is equal to $24.0" \times 0.1"$, or $2.4"^2$. Compared with the prior art injection nozzle, the present invention represents an improvement in the value for the "effective injection nozzle"

by a ratio of more than 10:1. Fibers passing through the nozzle of conventional injection molding machines are first damaged as they are squeezed through the narrow opening in the nozzle tip and are further damaged as they pass at an approximate 90 degree angle from the injector nozzle into the mold cavity. Fibers introduced into the mold cavity according to the present invention escape damage at the first step because no squeezing results as the charge passes from the transfer pot 118 into the mold cavity. And given the pre-orientation of the fibers within the charge 236, as the charge 236 is compressed from the bottom and is forced to spread into the cavity at the top, the resin (and its fibers) spreads out in a parallel configuration relative to the mold cavity. Accordingly, both orifice-passing damage as well as cavity-entering damage are eliminated by the method and apparatus of the present invention.

FIG. 19 illustrates a cross sectional view of an alternative mold assembly for producing a part according to the present invention. While the assembly illustrated in FIG. 19 is similar to that illustrated in FIGS. 18A through 18C, the assembly of FIG. 19 incorporates features to enhance the versatility of the present invention. Specifically, because the apparatus of the present invention allows for the molding of complex parts in a single operation (including the outer skin and inner structural elements of vehicle body components as set forth below with respect to FIGS. 21 and 22), modifications of the mold assembly are necessary.

Accordingly, the assembly of FIG. 19 illustrates a lifter 300 associated with the lower die 276 and a slide 302 positioned between the upper die 274 and the lower die 276. The lifter 300 and the slide 302 allow for the molding of complex angles and for the removal of the component after curing. The lifter 300 and the slide 302 are shown in the same assembly for illustrative purposes only, and it is to be understood that one could be used without the other.

Figure 20:
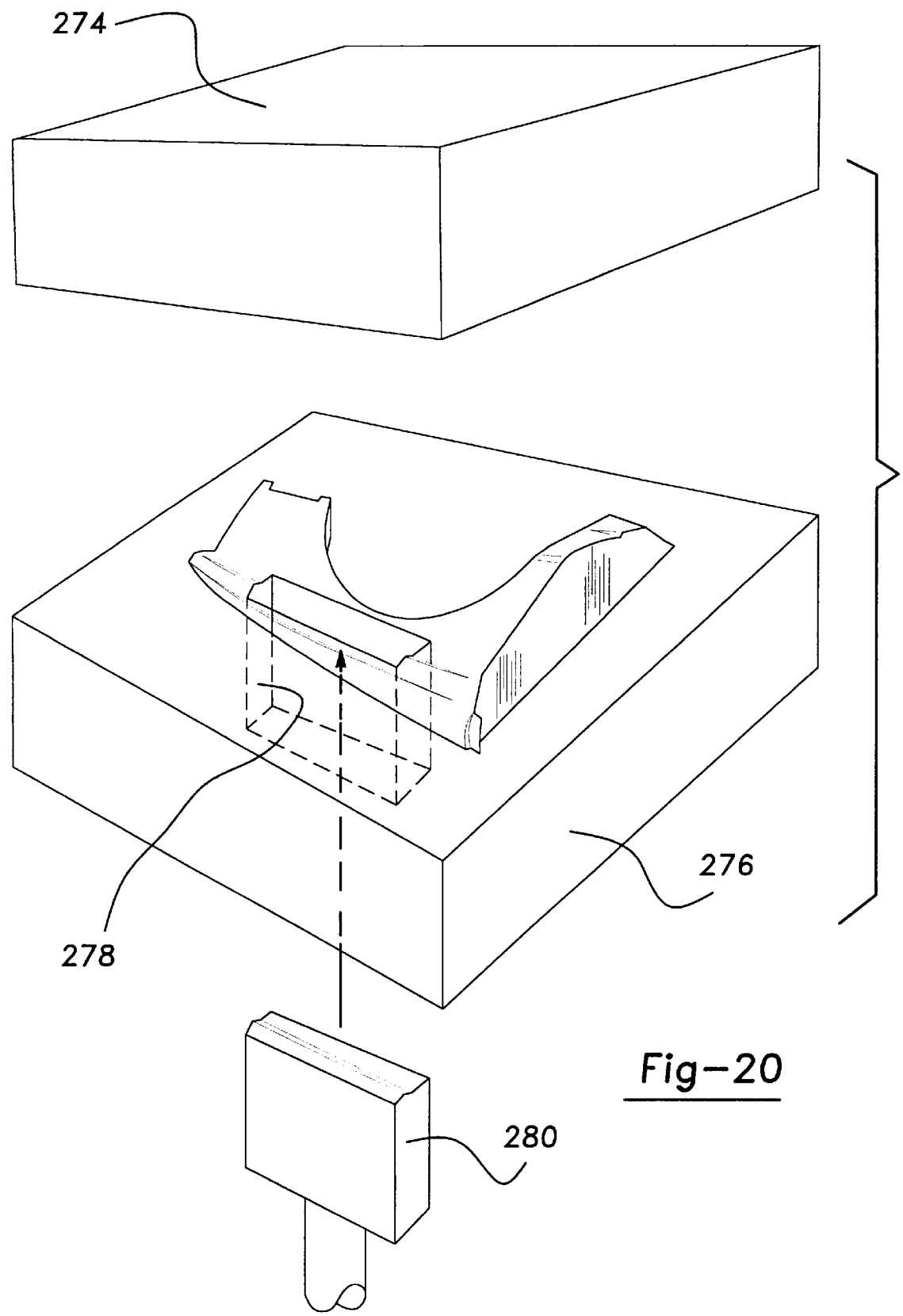
FIG. 20 is an exploded view of the upper and lower dies and the movable platform.

FIG. 20 further illustrates the versatility of the present invention and shows an exploded perspective view of each of the upper die 274, the lower die 276, and the platform 280 relative to each other. The upper surface of the platform 280 is a segment of the mold surface of the lower die 276 which has been "removed" to allow formation of the transfer pot 278. Accordingly, when the platform 280 is raised to its maximum injection position as illustrated in FIG. 18C, the upper surface of the platform 280 substantially forms a continuous surface with the upper surface of the lower die 276, thus eliminating or minimizing surface imperfections on the underside of the finished product.

Figure 21:
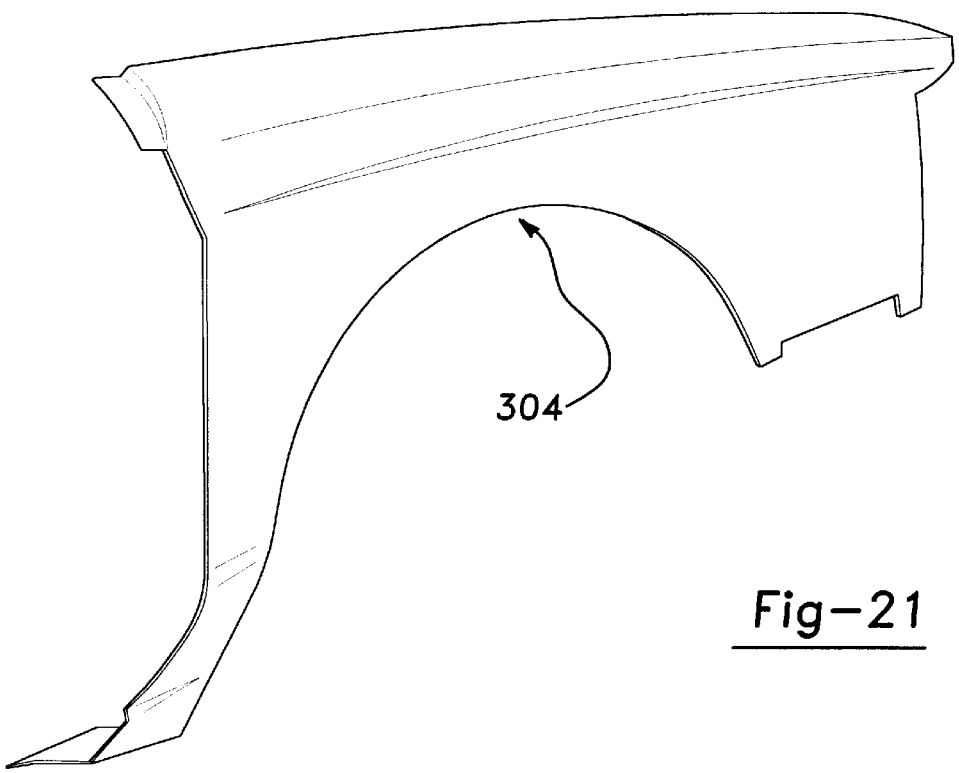
FIG. 21 is a perspective view of the exterior of an article molded according to the method and with the apparatus of the present invention.
Figure 22:
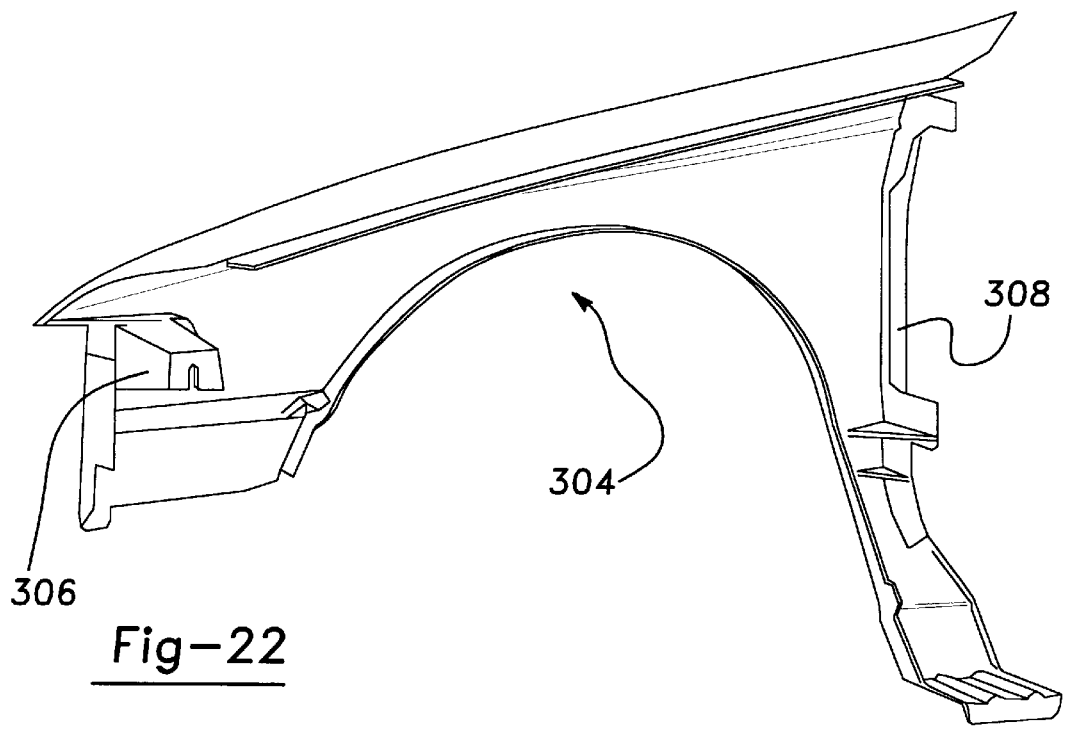
FIG. 22 is a perspective view of the interior of the article of FIG. 21.

The component produced by the apparatus of the present invention in accordance with the above-described method may be a complex, vertical or horizontal member as illustrated as a one-piece automobile fender generally shown as 304 in FIGS. 21 and 22. The fender 304 includes integrally formed nose and rear reinforcements 306 and 308, respectively. The fender 304 of FIGS. 21 and 22 represents a significant improvement over the prior art, such as a fender 400 illustrated in FIG. 23 which requires physical attachment (such as by mechanical fastening or chemical adhesion) of a nose reinforcement 402 and a rear reinforcement 404 in a secondary operation.

While a fender has been illustrated as a product of the method and apparatus of the present invention, it should be understood that the scope of the invention need not be so limited since those skilled in the art will appreciate that its teachings can be used in a much wider variety of applications such as on other parts found in the motor vehicle including doors, engine hoods, trunk lids, roofs, firewalls, inner fenders, radiator supports, valve covers, and cross car beams.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

We claim:

1. An apparatus for molding a fiber reinforced part, said apparatus comprising:

a charge forming unit for forming a charge of resin having a plurality of reinforcing fibers, wherein the fibers are positioned in parallel horizontal planes; and a molding unit including an upper die and a lower die cooperating to form at least part of a mold cavity when closed; said lower die having an opening therein; a platform in the opening in the lower die; and moving means for moving the platform relative to the lower die;

said moving means lowering the platform below the lower die to permit a charge to be loaded thereon;

means for closing the upper and lower dies together to form the mold cavity; and said moving means, thereafter, raising the platform towards the lower die to introduce the charge into the mold cavity so that the fibers are maintained in an orientation roughly parallel to the die surface to form a fiber reinforced part in which the fiber integrity is essentially undisturbed from Initial charge forming through final curing.

2. The apparatus of claim 1 which further comprises:

slide means for cooperating with at least one of the dies to form an undercut portion in the mold cavity.

3. The apparatus of claim 1 which further comprises:

a charge forming unit for forming a sheet of resin with the reinforcing fibers therein;

cutting means for cutting the sheet into slabs; and loading means for transferring at least one of the slabs onto the platform.

4. The apparatus of claim 3 which further comprises:

means for stacking the slabs to form a multilayered charge; and means for preheating the charge prior to being loaded onto the platform.

5. The apparatus of claim 1 which further comprises:

means for creating a vacuum in the mold cavity after the mold is closed.

6. The apparatus of claim 1 further comprising an automated device containing a pivotally mounted bracket on a supporting structure to transfer the charge to the molding apparatus.

7. An apparatus for molding a fiber reinforced part from a charge having a plurality of reinforcing fibers disposed in a resin, said apparatus comprising:

a charge forming unit for forming said charge of resin having a plurality of reinforcing fibers, wherein the fibers are positioned in parallel horizontal planes;

a molding unit having a lower die with a major surface defining an area, an upper die, a platform located within the lower die, and moving means for moving the platform relative to the lower die;

said moving means moving the platform from the lower die to allow the charge to be positioned thereon;

means for closing the upper and lower dies of the molding unit to define a mold cavity;

said moving means subsequently moving the platform relative to the mold cavity to introduce the charge Into the mold cavity so that the reinforcing fibers therein are substantially parallel to the major surface of at least the lower die;

said moving means continuing to move the platform until it is substantially flush with the lower die surface to thereby force the charge to flow and fill the mold cavity and maintain the fibers in an orientation roughly parallel to the die surface to form a fiber reinforced part in which the fiber integrity is essentially undisturbed from introducing the charge into the mold cavity through final curing; and means for removing the part from the mold cavity.

8. The apparatus of claim 7 which further comprises:

slide means for cooperating with at least one of the dies to form an undercut portion in the mold cavity.

9. The apparatus of claim 7 which further comprises:

means for creating a vacuum in the mold cavity after the mold is closed.

10. The apparatus of claim 7 further comprising an automated device containing a pivotally mounted bracket on a supporting structure to transfer the charge to the molding apparatus.

* * * * *

UNITED STATES PATENT AND TRADEMARK OFFICE
CERTIFICATE OF CORRECTION

PATENT NO. : 5,902,613
DATED : May 11, 1999
INVENTOR(S) : Jack J. Ritchie et al

It is certified that error appears in the above-identified patent and that said Letters Patent is hereby corrected as shown below:

IDS 12/29/97 On the Front Page, Under Other Publications, First Publication, Line 2, "1998," should be --1988,--

Col. 5, line 30 - "spaced" should be --space--

Col. 7, line 3 -delete "of" (first occurrence)

Col. 9, line 28 - "end" should be --end.--

Col. 9, line 32 - "multiply-layered" should be --multiple-layered--

Col. 11, line 4 - delete "is"

Col. 11, line 34 - "passed" should be --passes--

Col. 13, line 9 - "transfer pot 118" should be --transfer pot 278--

Col. 14, line 31 - "Initial" should be --initial--

Col. 15, line 4 - "Into" should be --into--

Signed and Sealed this

Fourteenth Day of December, 1999

Attest:

Q. TODD DICKINSON

*Attesting Officer*  *Acting Commissioner of Patents and Trademarks*